United States Patent [19]

Fejes

[11] Patent Number: 4,683,805

[45] Date of Patent: Aug. 4, 1987

[54] ROTARY ACTUATOR HAVING INTEGRAL PISTON ASSEMBLY WITH FLOATING RACK

[75] Inventor: Julius Fejes, Orrville, Ohio

[73] Assignee: Flo-Tork, Inc., Orrville, Ohio

[21] Appl. No.: 880,195

[22] Filed: Jun. 30, 1986

Related U.S. Application Data

[63] Continuation of Ser. No. 715,838, Mar. 25, 1985, abandoned.

[51] Int. Cl.[4] .......... F16J 1/10; F01B 9/00

[52] U.S. Cl. .......... 92/129; 92/136; 92/138

[58] Field of Search .......... 92/129, 136, 138; 74/109, 422

[56] References Cited

U.S. PATENT DOCUMENTS

| | | | |
|---|---|---|---|
| 1,734,094 | 11/1932 | MacKay | 92/136 |
| 2,737,157 | 3/1956 | Hefner et al. | 92/129 |
| 2,844,128 | 7/1958 | Steiner . | |
| 3,104,589 | 9/1963 | Rudd | 92/129 |
| 3,156,160 | 11/1964 | Meyer et al. . | |
| 3,213,760 | 10/1965 | Carr . | |
| 3,246,581 | 4/1966 | Carr . | |
| 3,376,895 | 4/1968 | Pray | 92/138 |
| 3,619,950 | 11/1971 | Price | 74/422 |
| 3,854,418 | 12/1974 | Bertin | 74/422 |
| 3,885,460 | 5/1975 | Park | 92/138 |
| 4,019,220 | 4/1977 | Lieberman | 92/130 |
| 4,539,857 | 9/1985 | Kako et al. | 74/422 |

FOREIGN PATENT DOCUMENTS

| | | | |
|---|---|---|---|
| 1957665 | 6/1970 | Fed. Rep. of Germany | 92/136 |
| 3306613 | 9/1984 | Fed. Rep. of Germany | 92/136 |

OTHER PUBLICATIONS

"Flo-Tork Rotary Actuators-Hydraulic and Air", Flo-Tork, Inc., Orrville, Ohio, 1984, pp. 3-6.

*Primary Examiner*—Robert E. Garrett
*Assistant Examiner*—Mark A. Williamson
*Attorney, Agent, or Firm*—Oldham, Oldham & Weber, Inc.

[57] ABSTRACT

A rotary actuator of the rack and pinion type having a two-piece rack and piston assembly. This rack and piston assembly comprises a rack insert and a one-piece piston member, which includes a piston at each end, a connecting strut extending from one piston to the other and means for retaining the rack insert in such manner that the rack is free to float in any direction except longitudinally but is constrained from longitudinal movement.

4 Claims, 5 Drawing Figures

ROTARY ACTUATOR HAVING INTEGRAL PISTON ASSEMBLY WITH FLOATING RACK

CROSS-REFERENCE

This is a continuation of application Ser. No. 715,838, filed Mar. 25, 1985 now abandoned.

TECHNICAL FIELD

This invention relates to rotary actuators and more particularly to rotary actuators of the rack and pinion type.

A rotary actuator is a device which translates fluid energy into rotary motion. Essentially, the rotary motion is accomplished by applying fluid under pressure to a piston which is inside a cylinder. Movement of the piston drives a linear gear rack, which in turn drives a pinion gear mated to it, imparting rotary motion to the output shaft. The output shaft is mounted between two support bearings and is connected to a load, either directly, through a coupling, or by linkage. Rotary actuators are known to provide economical, energy-efficient power converters for numerous applications. They come in various sizes having different rotations and torque outputs. A very precise degree of rotation of the pinion and the output shaft can be obtained by appropriate choice of rack length and pinion diameter.

BACKGROUND ART

Various constructions of rack and pinion type rotary actuators are known. For example, U.S. Pat. No. 3,246,581 to Carr illustrates one such construction. The actuator shown in the Carr patent has a rack assembly and a pair of pistons which are connected by pins in such a way as to form a lost motion connection, so that the pistons are free to float a limited distance relative to the rack assembly. The rack assembly includes a number of pieces which must be secured together. Such construction is relatively expensive to manufacture and assemble. Also, the pins must be removed whenever a rack is to be replaced.

One-piece rack and piston assemblies in rotary actuators are known. Constructions of this type are shown, for example, in Steiner U.S. Pat. No. 2,844,128, Meyer et al U.S. Pat. No. 3,156,160 and Carr U.S. Pat. No. 3,213,760. One piece rack and piston assemblies such as those shown in these patents are relatively inexpensive to manufacture compared to the multiple piece arrangement such as that shown in Carr U.S. Pat. No. 3,246,581 cited above. However, a floating piston is desirable for some services and one-piece rack and piston assemblies do not necessarily meet this requirement.

DISCLOSURE OF INVENTION

It is an object of this invention to provide a rotary actuator having a minimum of moving parts.

A more specific object is to provide a rotary actuator having a floating rack but with a minimum of moving parts.

A further object is to provide a rotary actuator which is easy to assemble and in which the rack can be quickly and easily replaced.

These and other objects are accomplished by providing a reciprocable rack and piston assembly comprising a one-piece rack insert in which a rack and rack bearing are integrally joined and/or are one and the same, and a one-piece piston member having a piston at each end, means connecting the two pistons and means for retaining said rack insert in such manner that the rack insert is free to float in any direction except longitudinally but is constrained from longitudinal movement.

BEST MODE FOR CARRYING OUT THE INVENTION

This invention will be described with particular reference to a fluid operated, double acting rotary actuator of the rack and pinion type, although it will be understood that this invention is also applicable to other types of rack and pinion rotary actuators.

Figure 1:
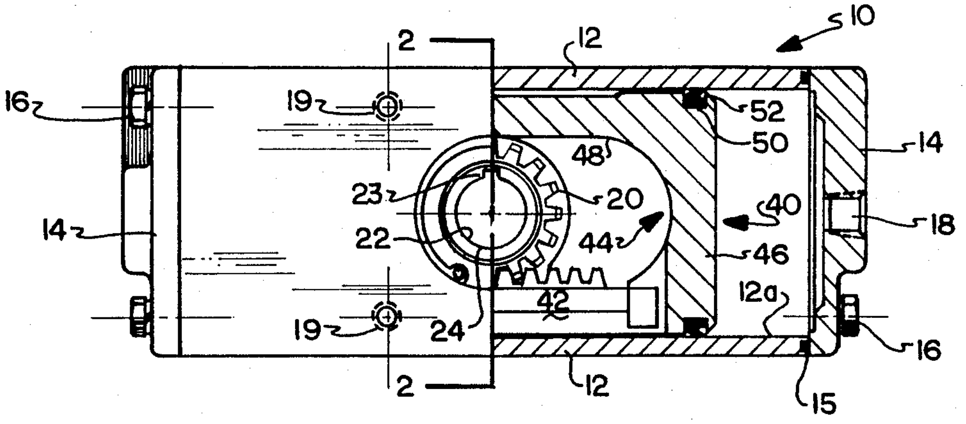
FIG. 1 is a front elevational view with parts shown in section, of a rotary actuator embodying the novel rack and piston assembly of this invention.
Figure 2:
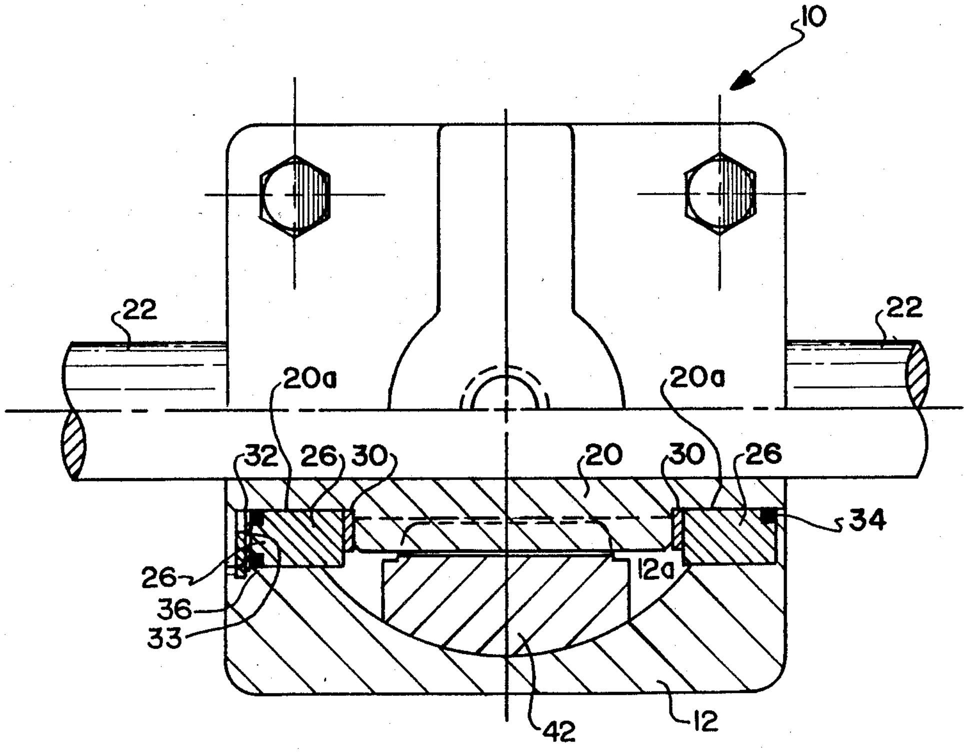
FIG. 2 is a sectional view taken along 2—2 of FIG. 1.

Referring now to FIGS. 1 and 2, 10 indicates generally an air operated rotary actuator of the rack and pinion type. Rotary actuator 10 has a housing 12 having an inside wall of circular cross section and an outside wall of square or rectangular cross section. The two ends of housing 12 are closed by end caps 14. Housing 12 and end caps 14 together form a chamber for a pinion and for the novel rack and piston assembly of this invention, as will be hereafter described. This chamber includes a longitudinally extending piston bore 12*a*, which is formed by the inside wall of housing 12, and in which the rack and piston assembly reciprocates. Sealing rings 15 provide a fluid tight seal between the housing 12 and the end caps 14. Bolts 16 secure the end caps to housing 12.

Each of the end caps 14 has a central port 18 for the admission of fluid under pressure. As will be described later, the rotary actuator 10 is driven by alternately admitting fluid under pressure first to one end of the rotary actuator and then to the other, in each case through a port 18. The exterior of housing 12 may be provided with screw-threaded bores 19 for mounting bolts. These bores do not extend to the interior of the housing.

Rotary actuator 10 is symmetrical about the line 2—2 in FIG. 1.

Rotary actuator 10 also has a pinion 20 and a pinion journal 20*a*, which are mounted in direct drive relationship. Pinion 20 drives an output shaft 22. Shaft 22 has a key 23. Shaft 22 may extend in both directions through an opening 24 in housing 12. This opening is located midway between the two ends of the rotary actuator 10. One end of shaft 22 terminates inside the housing 12.

Pinion journal 20*a* is mounted for rotation in bearings 26. Bearings 26 are held in place by thrust washers 30 and bearing retainers 32. O-rings 34 prevent leakage between the pinion journal 20*a* and bearing 26, while O-rings 36 prevent leakage between bearing 26 and housing 12.

The rotary actuator of this invention has a novel two-piece rack and piston assembly 40 which reciprocates in bore 12*a*. Rack and piston assembly 40 comprises a replaceable rack insert 42 and a one-piece reciprocable piston member 44.

Rack insert 42 is a one-piece member, and is preferably a metal casting in which a rack and a rack bearing are integrally joined and/or are one and the same. The top of rack insert 42 has a plurality of teeth which engage mating teeth on pinion 20. The bottom of rack insert 42 is cylindrical in shape and fitted to the cylindrical inside wall of rotary actuator 10. The bottom of rack insert 42 is a bearing surface which slides smoothly in the rotary actuator chamber. Rack insert 42 also includes a pair of tangs 42*a*, one at each end, for engaging piston member 44.

A wide rack insert 42 and pinion 20 are preferred. This makes it possible to use lower strength and less expensive materials than would normally be required. A wide rack insert also provides a large bearing area between the rack insert 42 and the inside wall of housing 12.

The length of the rack insert 42 is determined by the maximum number of degrees of desired rotation of the pinion 20 and its associated shaft 22. Rotations of either 90 degrees or 180 degrees are the most widely desired, although any desired degree of rotation may be obtained by appropriate selection of pinion diameter and rack length.

The one-piece piston member 44 will be described with particular reference to FIGS. 3, 4 and 5. Piston member 44 comprises at least one piston and means for engaging rack insert 42, thereby causing rack assembly 42 to reciprocate as piston member 44 reciprocates.

Figure 3:
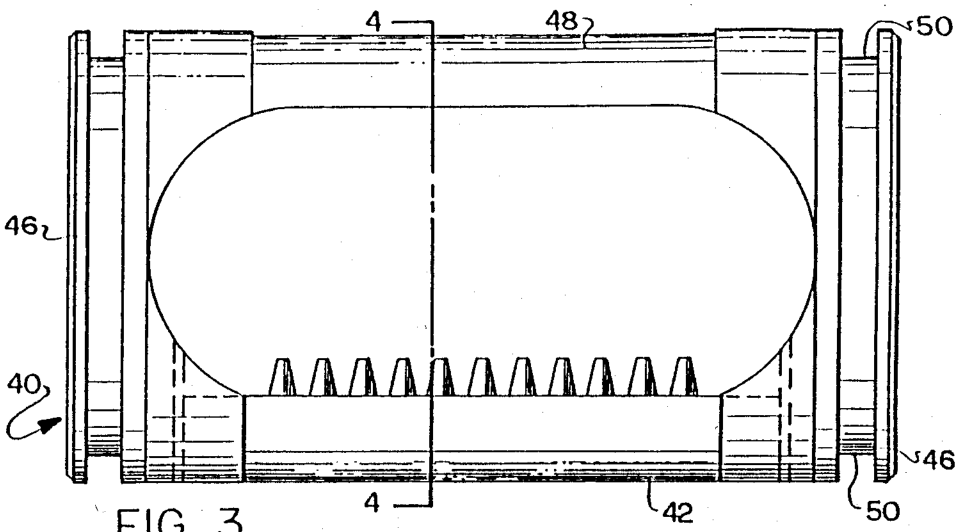
FIG. 3 is a front elevational view of the novel cast rack and piston assembly of this invention.
Figure 4:
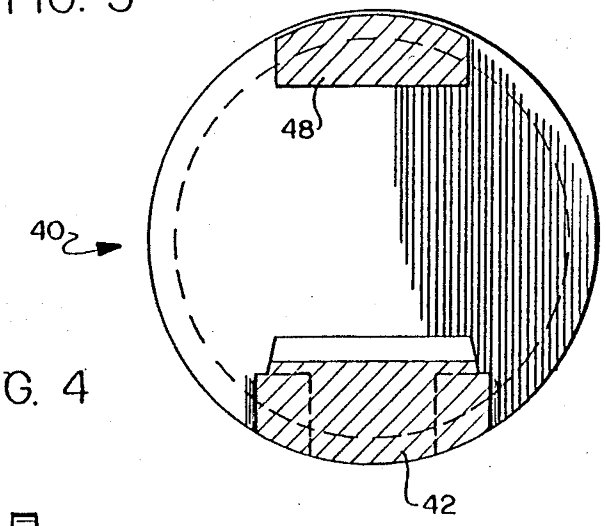
FIG. 4 is a sectional view taken along line 4—4 of FIG. 3.
Figure 5:
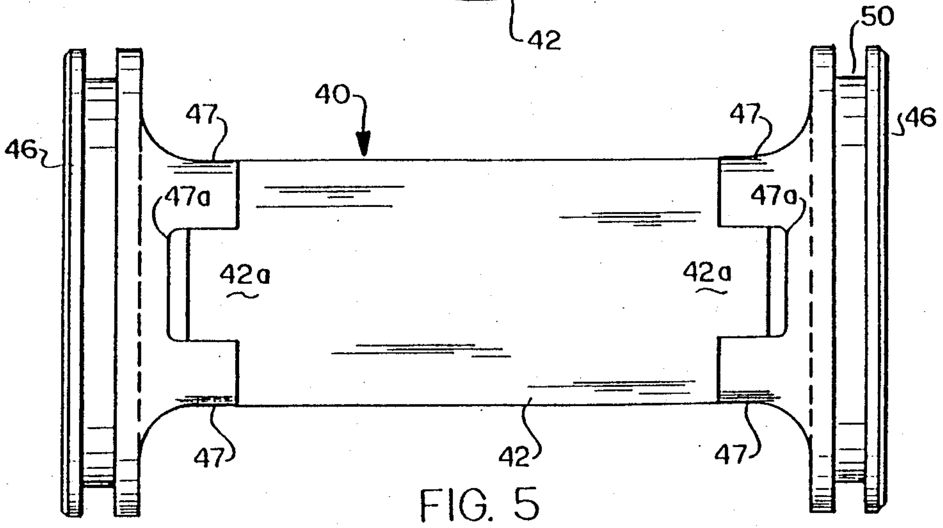
FIG. 5 is a bottom view of the piston member of this invention.

The preferred piston member 44 is a one-piece precision cast metal member as shown in the drawings and particularly in FIGS. 3, 4 and 5. Piston member 44 includes two pistons 46, one at each end, a pair of rack-retaining lugs 47 which extend inwardly from each piston toward the other and which form slots 47*a* to receive tangs 42*a*, and a support strut 48 which extends from one piston to the other and thereby connects the two pistons. Pistons 46 have grooves 50 to receive sealing rings 52 (see FIG. 1).

Lugs 47 engage the ends of rack insert 42 so that there is a snug fit between rack insert 42 and piston assembly 44. Rack insert 42 is free to float in any direction except longitudinally but is constrained from longitudinal movement (i.e., movement toward one of the end caps 14). This floating arrangement prevents forces transmitted by pinion 20 to rack insert 42 from being further transmitted to piston member 44. Instead, the separation force from the pinion will drive the rack insert against the cylinder wall but will not have any tendency to cock the piston member. This arrangement also makes the rack insert 42 self-aligning with respect to pinion 20.

When fluid pressure is applied to the left end of rotary actuator 10, the rack insert 42 and piston assembly 44 move as a unit to the right; conversely, application of fluid pressure to the right end of rotary actuator 10, causes the rack insert 42 and piston assembly 44 to move as a unit to the left.

There is no attachment means (such as a pin or the like) between piston member 44 and rack insert 42. Instead, piston member 44 drives rack insert 42 by direct contact between the two. This arrangement makes it easy to replace rack insert 42.

The piston material is one which can be cast and machined readily. A minimum of machining is required since the member may be cast to desired shape.

Various options not illustrated herein may be provided if desired. For example, a fluid cushion such as that illustrated in U.S. Pat. No. 3,213,760 to Carr may be provided to cushion the movement of rack and piston assembly 40 as it approaches either end of travel. Also, the limit of rotation of output shaft 22 may be adjusted by providing an adjustable stop such as that shown on page 10 of the brochure, "FLO-TORK Rotary Actuators" (FLO-TORK, Inc., Orrville, Ohio, 1984).

The piston member of this invention is light in weight and capable of manufacture at low cost with a minimum of machining. The piston and rack assembly provides a larger bearing area and wider tooth contact than do rack and rack bearing structure in presently known rotary actuators. A rotary actuator containing this piston member is easy to assemble because the rack insert and the piston member together comprise only two pieces, in contrast to the multiplicity of pieces required in typical floating piston rotary actuators known in the art. Also, the present construction permits quick and easy replacement of the rack insert.

While in accordance with the Patent statutes only a preferred embodiment has been illustrated and described in detail, it is to be particularly understood that the invention is not limited thereto or thereby.

What is claimed is:

1. In a fluid cotnrolled rotary actuator of the rack and pinion type including a housing having a cylinder wall defining a chamber having a rack and pinion therein, said chamber including a piston bore;

the improvement comprising a rack and piston assembly reciprocable in said bore, said rack and piston assembly comprising (a) a one-piece rack insert having rack teeth and a rack bearing surface, said rack bearing surface being adapted to bear against and slide along said cylinder wall, and (b) a one-piece piston member having a piston at each end, a support strut extending from one piston to the other, and lugs extending inwardly from each of sid pistons for engaging said rack insert whereby said rack insert is free to float in toward or away from the cylinder wall but is constrained from longitudinal movement with respect to said piston.

2. A rotary actuator according to claim 1 in which said piston member is formed by casting.

3. A rotary actuator according to claim 1 in which said lugs snugly engage said rack insert so that said rack insert is constrained from longitudinal movement relative to said piston assembly but is free to float toward or away from the cylinder wall of said rotary actuator.

4. A rotary actuator according to claim 1 in which said rack insert frictionally engages said one-piece piston member.

* * * * *